US012655293B2

(12) United States Patent
Kimura

(10) Patent No.: US 12,655,293 B2
(45) Date of Patent: Jun. 16, 2026

(54) THERMALLY-CONDUCTIVE SILICONE COMPOSITION

(71) Applicant: Fuji Polymer Industries Co., Ltd., Nagoya (JP)

(72) Inventor: Yuko Kimura, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 539 days.

(21) Appl. No.: 18/264,686

(22) PCT Filed: Nov. 19, 2021

(86) PCT No.: PCT/JP2021/042563
§ 371 (c)(1),
(2) Date: Aug. 8, 2023

(87) PCT Pub. No.: WO2022/172547
PCT Pub. Date: Aug. 18, 2022

(65) Prior Publication Data
US 2024/0124710 A1 Apr. 18, 2024

(30) Foreign Application Priority Data
Feb. 15, 2021 (JP) ................................ 2021-022019

(51) Int. Cl.
*C08L 83/08* (2006.01)
*C08K 3/22* (2006.01)

(52) U.S. Cl.
CPC ................ *C08L 83/08* (2013.01); *C08K 3/22* (2013.01); *C08K 2003/2227* (2013.01); *C08K 2201/001* (2013.01)

(58) Field of Classification Search
CPC .......... C08L 83/08; C08G 77/12; C08G 77/20
See application file for complete search history.

(56) References Cited

U.S. PATENT DOCUMENTS

2005/0038183 A1* 2/2005 Ahn ........................ C08L 83/08
524/861
2005/0038188 A1* 2/2005 Ahn ........................ C08L 83/04
264/272.17

(Continued)

FOREIGN PATENT DOCUMENTS

JP 59-136954 8/1984
JP 63-067335 B 12/1988

(Continued)

OTHER PUBLICATIONS

International Search Report issued in International Application No. PCT/JP2021/042563, Jan. 25, 2022, 5 pages w/ translation.

(Continued)

*Primary Examiner* — Randy P Gulakowski
*Assistant Examiner* — Holley Grace Hester
(74) *Attorney, Agent, or Firm* — HSML P.C.

(57) ABSTRACT

The present invention provides a thermally-conductive silicone composition including an organopolysiloxane as a base polymer and a thermally-conductive filler. The base polymer includes a fluorine-free organopolysiloxane and a fluorine-containing organopolysiloxane. The thermally-conductive silicone composition has been cured using an addition-curing catalyst. The ratio of the number of fluoro groups in constituent components of the base polymer to the total number of alkenyl groups bonded to silicon atoms in the constituent components of the base polymer is from 2.00 to 30.0.

9 Claims, 1 Drawing Sheet

(56) References Cited

U.S. PATENT DOCUMENTS

| | | | |
|---|---|---|---|
| 2006/0100343 | A1 | 5/2006 | Osawa |
| 2017/0121583 | A1 | 5/2017 | Koshikawa et al. |
| 2021/0253927 | A1 | 8/2021 | Ichiroku |

FOREIGN PATENT DOCUMENTS

| | | |
|---|---|---|
| JP | 2006-089675 | 4/2006 |
| JP | 2006-161032 | 6/2006 |
| JP | 2008-031227 | 2/2008 |
| JP | 2017-082090 | 5/2017 |
| JP | 2020-007463 | 1/2020 |
| WO | 2008/013319 | 1/2008 |
| WO | 2019/235293 | 12/2019 |
| WO | 2020/004442 | 1/2020 |
| WO | 2020/068528 | 4/2020 |

OTHER PUBLICATIONS

Extended European Search Report issued in corresponding European Patent Application No. 21925792.0, Jul. 2, 2024, 7 pages.

* cited by examiner

THERMALLY-CONDUCTIVE SILICONE COMPOSITION

TECHNICAL FIELD

The present invention relates to a thermally-conductive silicone composition that is suitably interposed between a heat generating portion and a heat dissipating member in an electric/electronic component or the like.

BACKGROUND ART

In recent years, thermal interface materials made of silicone rubber, which are used for thermal countermeasures for heat generating portions of electronic components such as CPUs and power transistors, have been widely used in the automotive field because of their excellent heat resistance, weather resistance, and electrical insulation properties. However, silicone rubber is likely to swell or deteriorate when exposed to solvents such as toluene and gasoline. Therefore, it is difficult for silicone rubber to maintain its performance in an environment in which it is exposed to ATF (Automatic Transmission Fluid) or the like.

Patent Documents 1 and 2 have proposed compositions obtained by adding a thermally-conductive filler to polyorganosiloxane containing fluorine, which has high oil resistance, in the main chain and side chains. Furthermore, Patent Document 3 has proposed that fluorine rubber after curing and silicone rubber after curing be blended and then cured again.

CITATION LIST

Patent Documents

Patent Document 1: JP 2017-82090A
Patent Document 2: JP 563-67335B
Patent Document 3: JP 2006-161032A

DISCLOSURE OF INVENTION

Problem to be Solved by the Invention

However, the above-mentioned silicone compositions of Patent Documents 1 and 2 have an issue that fluoro-containing polyoorganosiloxane is expensive. Furthermore, the silicone composition of Patent Document 3 has a complicated process and high cost because the curing reaction is performed twice, and has little chemical bonding because the rubbers are blended with each other after curing, making it difficult to apply the composition to heat-resistant applications.

In order to solve the above-described conventional issues, the present invention provides a thermally-conductive silicone composition that contains less fluorine-containing organopolysiloxane, is available at a lower cost, and exhibits oil resistance.

Means for Solving Problem

The present invention is directed to a thermally-conductive silicone composition containing organopolysiloxane as a base polymer and a thermally-conductive filler, wherein the base polymer includes a fluorine-free organopolysiloxane and a fluorine-containing organopolysiloxane. The thermally-conductive silicone composition has been cured using an addition-curing catalyst, and a ratio of the number of fluoro groups in constituent components of the base polymer to the total number of alkenyl groups bonded to silicon atoms in the constituent components of the base polymer is from 2.00 to 30.0.

The present invention is further directed to a method for producing a thermally-conductive silicone gel sheet, including uniformly mixing a composition containing a base polymer including a fluorine-free organopolysiloxane and a fluorine-containing organopolysiloxane, an addition-curing catalyst, and a thermally-conductive filler, forming the composition into a sheet-like shape, and thermally curing the composition, wherein a ratio of the number of fluoro groups in constituent components of the base polymer to the total number of alkenyl groups bonded to silicon atoms in the constituent components of the base polymer is from 2.00 to 30.0.

Effects of the Invention

According to the present invention, the base polymer includes a fluorine-free organopolysiloxane and a fluorine-containing organopolysiloxane such that the ratio of the number of fluoro groups to the total number of alkenyl groups bonded to silicon atoms is from 2.00 to 30.0, and thus it is possible to provide a thermally-conductive silicone composition that contains less fluorine-containing organopolysiloxane, is available at a lower cost, and exhibits oil resistance.

DESCRIPTION OF THE INVENTION

Figure 1A:
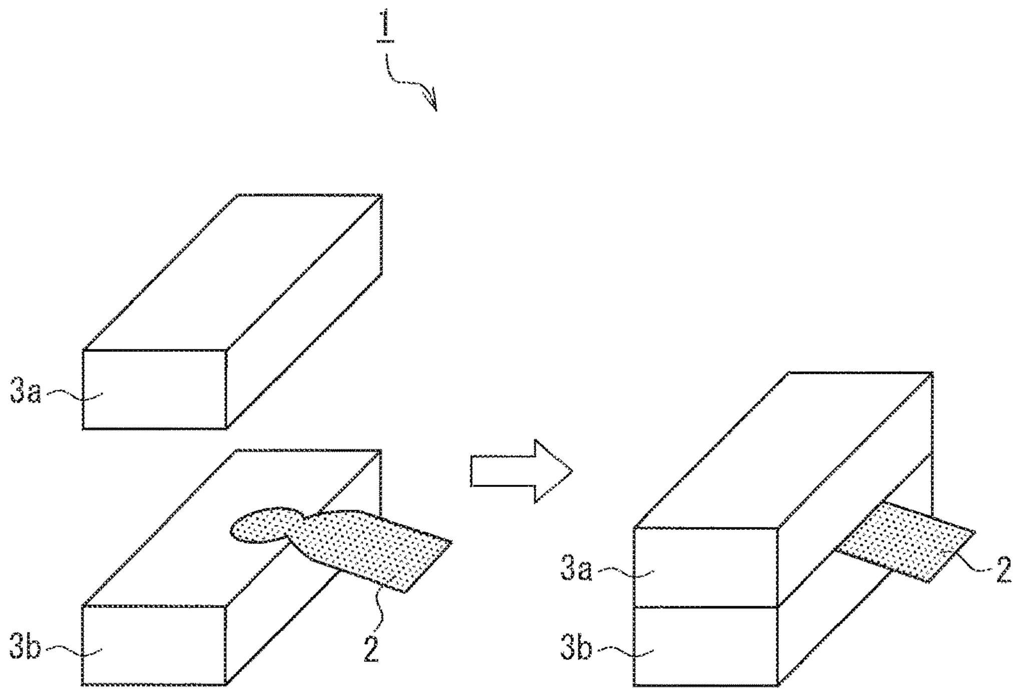
FIGS. 1A and 1B are explanatory diagrams showing a method for measuring the thermal conductivity of a sample according to an embodiment of the present invention.

The present invention is directed to a thermally-conductive silicone composition containing an organopolysiloxane as a base polymer and a thermally-conductive filler. The base polymer includes a fluorine-free organopolysiloxane and a fluorine-containing organopolysiloxane. These are known as silicone gel materials or silicone rubber materials, respectively. The thermally-conductive silicone composition has been cured using an addition-curing catalyst. The ratio of the total number of fluoro groups in constituent components of the base polymer to the total number of alkenyl groups bonded to silicon atoms in the constituent components of the base polymer (the number of fluoro groups/the number of alkenyl groups) is from 2.00 to 30.0, preferably from 2.00 to 20.0, and more preferably from 2.50 to 18.0. Since the base polymer includes a fluorine-free organopolysiloxane and a fluorine-containing organopolysiloxane such that the ratio is within the above-mentioned range, the cost is reduced, the oil resistance is excellent, and the hardness is suitable for a thermal interface material (TIM).

The content of alkenyl groups bonded to silicon atoms in the constituent components of the base polymer is preferably from 0.010 to 0.013 mol, more preferably from 0.011 to 0.013 mol, and even more preferably from 0.012 to 0.013 mol, per 100 g of base polymer.

The base polymer is preferably an addition-curing silicone polymer. This polymer has high thermal resistance and is useful as a thermally-conductive sheet. The base polymer includes, as the constituent components, a component A1, a component A2, a component A3, and a component B, for example.

A1: Fluorine-free organopolysiloxane having two or more alkenyl groups in one molecule A2: Fluorine-free organopolysiloxane having two Si—H groups in one molecule A3: Fluorine-free organopolysiloxane having three or more Si—H groups in one molecule B: Fluorine-containing organopolysiloxane having two or more alkenyl groups in one molecule The component A3 is a cross-linking component. The base polymer includes both the component A2 and the component A3 as an organopolysiloxane having two or more Si—H groups, which is advantageous in that the hardness can be easily adjusted and the restorability of the cured material can be improved.

The ratio of the total number of Si—H groups in the constituent components of the base polymer to the total number of alkenyl groups bonded to silicon atoms in the constituent components of the base polymer (the number of Si—H groups/the number of alkenyl groups) is preferably from 0.6 to 1.2, more preferably from 0.7 to 1.1, and even more preferably from 0.8 to 1.1.

The composition ratio of the thermally-conductive silicone composition is preferably as follows, for example.

The component A2 is contained in an amount of 50 to 100 parts by mass, and the component A3 is contained in an amount of 0.5 to 2 parts by mass, with respect to 100 parts by mass of the component A1 and the component B in total.

The addition-curing catalyst is contained in a catalytic amount.

The thermally-conductive filler is contained in an amount of 100 to 4000 parts by mass with respect to 100 parts by mass of the base polymer.

The component A2 is more preferably contained in an amount of 60 to 80 parts by mass, and the component A3 is more preferably contained in an amount of 0.5 to 1 part by mass, with respect to 100 parts by mass of the component A1 and the component B in total. The thermally-conductive filler is more preferably contained in an amount of 500 to 3700 parts by mass with respect to 100 parts by mass of the base polymer from the viewpoint of enhancing the thermal conductivity. The amount of the addition-curing catalyst may be any amount necessary for curing the composition, and may be adjusted as appropriate according to the desired curing speed and other factors. For example, the addition-curing catalyst is added in an amount of preferably 0.01 to 1000 ppm as metal atom weight, with respect to the total of the component A1 and the component B.

Component A1

The component A1 is a fluorine-free organopolysiloxane having two or more alkenyl groups in one molecule. The fluorine-free organopolysiloxane has two or more alkenyl groups bonded to silicon atoms in one molecule, and each alkenyl group is an alkenyl group with 2 to 8 carbon atoms, and more preferably with 2 to 6 carbon atoms, such as a vinyl group or an allyl group. The component A1 is preferably a linear organopolysiloxane having one vinyl group at each end of the molecular chain, and including a side chain having an organic group such as an alkyl group or a phenyl group, or a combination thereof. The number of silicon atoms in one molecule (i.e., degree of polymerization) may be approximately from 1 to 1350, and preferably approximately from 150 to 300, for example. Note that the linear organopolysiloxane may contain a small amount of branched structure (trifunctional siloxane unit) in the molecule.

The kinematic viscosity of the component A1 is preferably from 10 to 10000 $mm^2/s$, more preferably from 50 to 550 $mm^2/s$, and even more preferably from 100 to 500 $mm^2/s$, in order to achieve good operability and curability. The kinematic viscosity is shown in a manufacturer's catalog or the like, and is a kinematic viscosity at 25° C. measured using an Ubbelohde viscometer.

Specific examples of the component A1 include a dimethylpolysiloxane having each end of the molecular chain capped with a dimethylvinylsiloxy group, a dimethylpolysiloxane having each end of the molecular chain capped with a methylphenylvinylsiloxy group, a dimethylsiloxane-methylphenylsiloxane copolymer having each end of the molecular chain capped with a dimethylvinylsiloxy group, and a dimethylsiloxane-methylvinylsiloxane copolymer having each end of the molecular chain capped with a dimethylvinylsiloxy group. They can be used alone or in a combination of two or more.

Component A2

The component A2 is a fluorine-free organohydrogen polysiloxane having two Si—H groups in one molecule, in which the molecular structure is preferably linear and the Si—H groups are preferably located at the two ends of the molecular chain respectively. The number of silicon atoms in one molecule (i.e., degree of polymerization) may be approximately from 2 to 1,000, and preferably approximately from 2 to 300, for example. Organic groups bonded to silicon atoms other than hydrogen atoms may be unsubstituted or substituted monovalent hydrocarbon groups having no aliphatic unsaturated bonds, and preferably are those with 1 to 10 carbon atoms, and more preferably with 1 to 6 carbon atoms, for example. Specific examples thereof include: alkyl groups such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups such as a phenyl group, a tolyl group, a xylyl group, and a naphthyl group; aralkyl groups such as a benzyl group, a phenylethyl group, and a phenylpropyl group; and those obtained by substituting some or all of the hydrogen atoms in the above-listed groups with halogen atoms other than fluorine such as bromine or chlorine or with cyano groups, for example, alkyl groups substituted with halogen other than fluorine (e.g., a chloromethyl group, a chloropropyl group, and a bromoethyl group), and cyanoethyl groups.

The kinematic viscosity of the component A2 is preferably from 2 to 10000 $mm^2/s$, even more preferably from 500 to 2000 $mm^2/s$, and even more preferably from 500 to 1500 $mm^2/s$, in order to achieve good operability and curability.

Component A3

The component A3 is a fluorine-free organohydrogen polysiloxane having three or more Si—H groups in one molecule, in which the molecular structure is preferably linear. Note that the organohydrogen polysiloxane may contain a small amount of branched structure (trifunctional siloxane unit) in the molecule. Examples of the organohydrogen polysiloxane include that with the structure represented by General Formula (1) below.

(1)

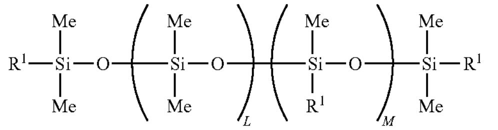

In the formula, $R^1$s are optionally the same or different substances selected from hydrogen, an alkyl group, a phenyl group, an epoxy group, an acryloyl group, a methacryloyl group, and an alkoxy group, at least three of which are hydrogen. L is an integer of 0 to 1,000, and in particular 0 to 300, and M is an integer of 1 to 200.

The kinematic viscosity of the component A3 is preferably from 20 to 10000 $mm^2/s$, even more preferably from 60 to 8000 $mm^2/s$, and even more preferably from 60 to 200 $mm^2/s$, in order to achieve good operability and curability.

Component B

The component B is a fluorine-containing organopolysiloxane having two or more alkenyl groups in one molecule. The fluorine-containing organopolysiloxane has two or more alkenyl groups bonded to silicon atoms in one molecule, and each alkenyl group is an alkenyl group with 2 to 8 carbon atoms, and more preferably with 2 to 6 carbon atoms, such as a vinyl group or an allyl group. The component B is preferably a linear fluorine-containing organopolysiloxane having one vinyl group at each end of the molecular chain, and including a side chain having an unsubstituted or substituted monovalent hydrocarbon group, and the substituted monovalent hydrocarbon group is an organic group such as an alkyl group, an aryl group, or an aralkyl group obtained by substituting some or all of the hydrogen atoms with fluorine atoms, or a combination thereof. Examples thereof include a fluorine-containing dimethylpolysiloxane at least having a dimethylvinylsiloxy group at each end thereof.

The kinematic viscosity of the component B is preferably from 10 to 10000 $mm^2/s$, even more preferably from 250 to 2000 $mm^2/s$, and even more preferably from 350 to 1500 $mm^2/s$, in order to achieve good operability and curability.

The substituents other than alkenyl groups in the component B are optionally the same or different unsubstituted or substituted monovalent hydrocarbon groups having no aliphatic unsaturated bonds, and the substituted monovalent hydrocarbon groups are each a monovalent hydrocarbon group obtained by substituting some or all of the hydrogen atoms with fluorine atoms. The unsubstituted or substituted monovalent hydrocarbon groups having no aliphatic unsaturated bonds are those preferably with 1 to 10 carbon atoms, and more preferably with 1 to 6 carbon atoms, for example. Specific examples thereof include: alkyl groups such as, a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups such as a phenyl group, a tolyl group, xylyl group, and a naphthyl group; aralkyl groups such as a benzyl group, a phenylethyl group, and a phenylpropyl group; and those obtained by substituting some or all of the hydrogen atoms in the above-listed groups with fluorine atoms.

Addition-Curing Catalyst

The addition-curing catalyst is a catalyst component for facilitating curing of the above-described composition. As the addition-curing catalyst, a catalyst used for a hydrosilylation reaction can be used. Examples thereof include platinum group metal catalysts such as platinum-based catalysts, palladium-based catalysts, and rhodium-based catalysts. Specific examples of the platinum-based catalysts include platinum black, secondary platinum chloride, platinum chloride, reaction products of platinum chloride and monohydric alcohol, complexes of platinum chloride with olefins or vinylsiloxane, and platinum bis(acetylacetonato).

Thermally-Conductive Filler

The thermally-conductive filler is preferably at least one type of thermally-conductive inorganic particles selected from alumina (aluminum oxide), zinc oxide, silicon oxide, silicon carbide, aluminum nitride, boron nitride, aluminum hydroxide, and silica. Of these substances, alumina (aluminum oxide) and aluminum nitride are particularly preferred. There is no particular limitation on the shape of the thermally-conductive filler, but examples thereof include a spherical shape, an irregular shape, a needle-like shape, and a plate-like shape.

There is no particular limitation on the aluminum oxide, but examples thereof include spherical alumina produced by heating and melting, sintered alumina produced by calcination in a kiln, electro-fused alumina produced by melting in an electric arc furnace, and high-purity alumina produced by hydrolysis or in situ chemical vapor deposition of aluminum alkoxide. The obtained aluminum oxide particles can be pulverized to the desired particle size range.

There is no particular limitation on the aluminum nitride, but known examples thereof include aluminum nitride produced by direct nitriding, reductive nitriding, combustion synthesis, or the like, and agglomerated aluminum nitride made by agglomerating the obtained aluminum nitride. The obtained aluminum nitride particles can also be pulverized to the desired particle size range.

The average particle size of the thermally-conductive filler is preferably from 0.01 to 200 μm, and more preferably from 0.1 to 150 μm. The average particle size is D50 (median size) of the cumulative particle size distribution based on the volume in the particle size distribution measurement by the laser diffraction light scattering method. As a measuring instrument, for example, a laser diffraction/scattering particle size distribution analyzer LA-950S2 manufactured by HORIBA, Ltd. can be used.

Optional Components

The thermally-conductive silicone composition may contain components other than those listed above as necessary, for example. Examples of the components other than those listed above include a heat resistance improver such as titanium oxide or cerium oxide, a masterbatch composition, a curing retardant, and an auxiliary flame retardant. Organic or inorganic pigments may be added for the purpose of coloring and toning, and silane coupling agents may be added as well.

Curing Retardant

Examples of the curing retardant include ethynylcyclohexanol. The curing retardant is added in an amount of preferably 0.001 to 0.1 parts by mass with respect to 100 parts by mass of the base polymer.

Master Batch Composition

The master batch composition is preferably a mixture obtained by mixing 100 to 300 parts by mass of iron-containing powder to 100 parts by mass of uncross-linked silicone gel. The master batch composition is added in an amount of preferably 1 to 12 parts by mass, and more preferably 1 to 10 parts by mass, with respect to 100 parts by mass of the base polymer. The iron-containing powder is at least one selected from iron, iron oxide, and iron-containing metal oxides. The iron oxide is preferably at least one selected from triiron tetraoxide ($Fe_3O_4$) and diiron trioxide ($Fe_2O_3$). They are useful as a coloring material, a stabilizing material, a flame retardant material, and the like.

The iron-containing powder is preferably surface-treated with a titanium-based coupling agent or an aluminum-based coupling agent. The surface treatment includes covalent bonding as well as adsorption. The surface treatment of the iron-containing powder with a coupling agent is expected to prevent adsorption of a curing catalyst such as a platinum-based catalyst, because the coupling agent molecules cover the surface of the iron-containing powder. Surface treatment methods using coupling agents include a dry method, a wet method, an integral blend method, and the like as described in JP 2020-7463A. The coupling agent preferably is added in an amount of 0.1 to 10 parts by mass, and more preferably 0.5 to 8 parts by mass, with respect to 100 parts by mass of the iron-containing powder.

Silane Coupling Agent

The thermally-conductive silicone composition may contain a silane coupling agent in an amount of more than 0 parts by mass and up to 200 parts by mass with respect to 100 parts by mass of the base polymer. Examples of the silane coupling agent include silane compounds represented by $R(CH_3)_aSi(OR')_{3-a}$ (R is an unsubstituted or substituted organic group with 1 to 20 carbon atoms, R' is an alkyl group with 1 to 4 carbon atoms, and a is 0 or 1), or partial hydrolysates thereof. An alkoxysilane compound (simply referred as "silane" hereinafter) represented by $R(CH_3)_aSi(OR')_{3-a}$ (R is an unsubstituted or substituted organic group with 1 to 20 carbon atoms, R' is an alkyl group with 1 to 4 carbon atoms, and a is 0 or 1) is a silane compound such as methyltrimethoxysilane, ethyltrimethoxysilane, propyltrimethoxysilane, butyltrimethoxysilane, pentyltrimethoxysilane, hexyltrimethoxysilane, hexyltriethoxysilane, octyltrimethoxysilane, octyltriethoxysilane, decyltrimethoxysilane, decyltriethoxysilane, dodecyltrimethoxysilane, dodecyltriethoxysilane, hexadodecyltrimethoxysilane, hexadodecyltriethoxysilane, octadecyltrimethoxysilane, or octadecyltriethoxysilane, for example. These silane compounds can be used alone or in a combination of two or more. The silane coupling agent can be used as a surface treatment agent for the thermally-conductive inorganic particles.

The thermal conductivity of the thermally-conductive silicone composition is preferably 0.8 W/mK or more, more preferably 1.0 W/mK or more, even more preferably 1.2 W/mK or more, even more preferably 2.0 W/mK or more, and even more preferably 2.3 W/mK or more.

The thermally-conductive silicone composition is preferably at least one selected from gel and rubber. Furthermore, the initial hardness on the Asker C scale of the thermally-conductive silicone composition is preferably from 1 to 70, more preferably from 20 to 60, and even more preferably from 30 to 60. If the initial hardness is within the above-mentioned range, the thermally-conductive silicone composition is soft and suitable for use as a thermal interface material (TIM) that is interposed between a heat generating member and a heat dissipating member.

The weight change of the thermally-conductive silicone composition after immersion in automatic transmission fluid (ATF) at 150° C. for 24 hours is preferably 5% by weight or less, and more preferably from 0.1 to 5% by weight. If the weight change is within the above-mentioned range, good oil resistance is obtained. The sample for the oil resistance test can be a piece with a width of 20 mm, a length of 20 mm, and a thickness of 3.0 mm.

The thermally-conductive silicone composition is preferably formed into a sheet-like shape. The thermally-conductive silicone composition in a sheet-like shape is suitable to be interposed between a heat generating member and a heat dissipating member.

The thermally-conductive silicone composition is preferably a thermal interface material that is interposed between a heat generating member and a heat dissipating member. The thermally-conductive silicone composition is particularly suitable for applications in which it is exposed to organic solvents, petroleum, gasoline, or the like.

A preferred method for producing the thermally-conductive sheet of the present invention is as follows. The method includes mixing the component A1, the component A2, the component A3, the component B, the addition-curing catalyst, the thermally-conductive filler, and the optional components as necessary at room temperature. The mixture may be defoamed under reduced pressure during or after mixing. The resulting thermally-conductive silicone composition is pressure-rolled or pressed into a sheet-like shape. The resulting sheet has been cured in an oven at 90 to 110° C. for 10 to 30 minutes.

EXAMPLES

Hereinafter, examples will be described. The present invention is not limited to the examples. Various parameters were measured by the following methods.

Thermal Conductivity

Figure 1B:
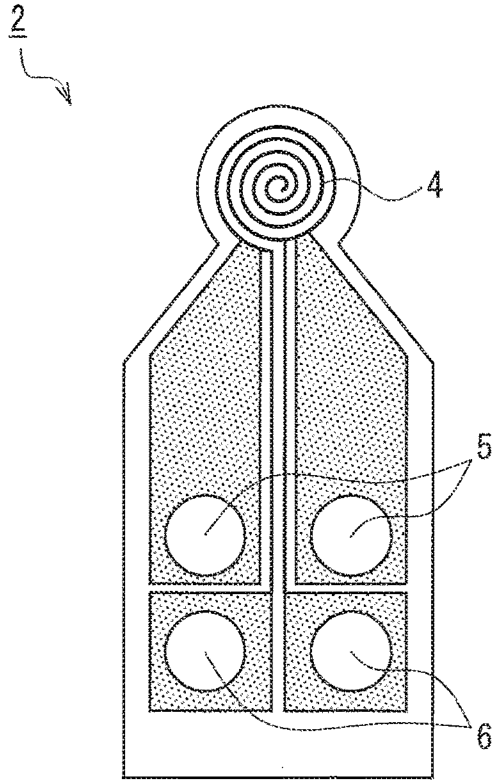

The thermal conductivity of the thermally-conductive silicone composition was measured by the hot disc method (as defined in ISO/CD 22007-2). In a thermal conductivity measuring apparatus 1, as shown in FIG. 1A, a sensor 2 made of a polyimide film was sandwiched between two samples 3*a* and 3*b*, a constant power was applied to the sensor 2 to constantly generate heat, and the thermal properties were analyzed from an increase in the temperature of the sensor 2. In the sensor 2, an end 4 has a diameter of 7 mm and has a double spiral structure of electrodes as shown in FIG. 1B, and a lower portion thereof has a current application electrode 5 and a resistance value electrode (temperature measurement electrode) 6. The thermal conductivity was calculated using the following formula (Formula 1).

$$\lambda = \frac{Po \cdot D(\tau)}{\pi^{3/2} \cdot r} \cdot \frac{D(\tau)}{\Delta T(\tau)} \quad \text{[Formula 1]}$$

λ: Thermal conductivity (W/m·K)
$P_0$: Constant power (W)
r: Radius of sensor (m)
τ: $\sqrt{\alpha \cdot t / r^2}$
α: Thermal diffusivity of sample ($m^2/s$)
t: Measuring time (s)
D(τ): Dimensionless function of τ
ΔT(τ): Temperature rise of sensor (K)

Oil Resistance Evaluation Test (1) A silicone gel sheet with a length (L) of 20 mm, a width (W) of 20 mm, and a thickness (t) of 3.0 mm is prepared as a test piece.

(2) The length, the width, the weight, and the thickness of the test piece before immersion in ATF oil are measured.
(3) The test piece is immersed in ATF oil in a test tube.
(4) The test tube is closed with a cork and heated in an oil bath at 150° C. for 24 hours.
(5) After cooling to room temperature, the test piece is taken out of the test tube, and any excess oil adhering to the test piece is wiped off with weighing paper.
(6) The length (L), the width (W), and the thickness (t) after immersion in oil immerse are measured.
(7) The weight change rate is calculated from a difference between weights before and after the test using the following formula.

$$\text{Weight change rate(wt \%)}=[(W2-W1)/W1]\times 100$$

In the formula, W1 is weight (g) of the test piece before the test, and W2 is weight (g) of the test piece after the test.

Hardness of Thermally-Conductive Silicone Sheet

The Asker C hardness was measured using a rubber hardness tester as defined in JIS K 7312.

Examples 1 to 4 and Comparative Examples 1 to 3

1. Material Components
(1) Base Polymer
A1: Fluorine-free linear organopolysiloxane having one vinyl group at each end of the molecular chain and having a kinematic viscosity of 350 $mm^2/s$ (dimethylpolysiloxane having each end of the molecular chain capped with a dimethylvinylsiloxy group)
A2: Fluorine-free linear organohydrogen polysiloxane having two Si—H groups in one molecule and having a kinematic viscosity of 1040 $mm^2/s$ (dimethylpolysiloxane having one Si—H group at each end of the molecular chain)
A3: Fluorine-free linear organohydrogen polysiloxane having three or more Si—H groups in one molecule and having a kinematic viscosity of 100 $mm^2/s$ (linear organopolysiloxane represented by General Formula (1) above, where L=32, M=26, and the number of Si—H groups in one molecule is 28)
B: Fluorine-containing linear organopolysiloxane having one vinyl group at each end of the molecular chain and having a kinematic viscosity of 1000 $mm^2/s$ (fluorine-containing dimethylpolysiloxane having each end of the molecular chain capped with a dimethylvinylsiloxy group)
(2) Addition-Curing Catalyst
A commercially available platinum-based catalyst was used as the addition-curing catalyst.
(3) Curing Retarder
Ethynylcyclohexanol was used as the curing retarder.
(4) Colorant
A black iron master batch composition obtained by adding 230 parts by mass of black iron oxide to 100 parts by mass of uncross-linked silicone gel and stirring the mixture was used as the colorant.
(5) Thermally-Conductive Filler
(i) Spherical alumina, average particle size 75 μm, surface treatment: not performed
(ii) Aluminum hydroxide with irregular shape, average particle size 50 μm, surface treatment: not performed
(iii) Crushed alumina, average particle size 2 μm, surface treatment agent: decyltrimethoxysilane
2. Mixing
The above-listed material components in amounts shown in Tables 1 and 2 were placed in a planetary mixer and mixed at 23° C. for 10 minutes. The mixture was defoamed under reduced pressure during or after mixing.
3. Forming and Curing Sheet
The thermally-conductive composition after mixing was pressure-rolled into a sheet-like shape with a thickness of 3 mm, and then cured through heating in an oven at 100° C. for 10 minutes. The physical properties of the resulting cured sheet are summarized in Tables 1 and 2.

TABLE 1

| | | Ex. 1 | Ex. 2 | Ex. 3 | Ex. 4 |
|---|---|---|---|---|---|
| A1: Organopolysiloxane having vinyl at each end (g) | | 95 | 90 | 80 | 70 |
| A2: Organopolysiloxane having two Si—H groups (g) | | 70 | 70 | 70 | 70 |
| A3: Organopolysiloxane having three or more Si—H groups (g) | | 1 | 1 | 1 | 1 |
| B: Fluorine-containing organopolysiloxane having vinyl at each end (g) | | 5 | 10 | 20 | 30 |
| Platinum-based catalyst (g) | | 0.3 | 0.3 | 0.3 | 0.3 |
| Curing retarder (g) | | 0.02 | 0.02 | 0.02 | 0.02 |
| Black iron master batch composition (g) | | 18 | 18 | 18 | 18 |
| Crushed alumina, D50 = 2 μm, surface treated (g) | | 733 | 733 | 733 | 733 |
| Spherical alumina, D50 = 75 μm (g) | | 165 | 165 | 165 | 165 |
| Aluminum hydroxide, D50 = 50 μm (g) | | 407 | 407 | 407 | 407 |
| Hardness (Asker C) | | 33 | 35 | 48 | 56 |
| Thermal conductivity (W/m · K) | | 2.49 | 2.47 | 2.58 | 2.61 |
| Number of alkenyl groups (mol)/base polymer 100 g | | 0.0128 | 0.0125 | 0.012 | 0.0115 |
| Number of fluoro groups/number of alkenyl groups | | 2.72 | 5.44 | 10.88 | 16.32 |
| Number of Si—H groups/number of alkenyl groups | | 0.92 | 0.93 | 0.97 | 1.01 |
| Oil resistance test (150° C., immersion for 24 h) | Weight before test (g) | 3.57 | 3.57 | 3.61 | 3.49 |
| | Weight after test (g) | 3.70 | 3.66 | 3.66 | 3.53 |
| | Weight difference (g) | 0.13 | 0.09 | 0.05 | 0.04 |
| | Weight change rate (wt %) | 3.6 | 2.5 | 1.4 | 1.1 |
| | Size before test L (mm) | 20.01 | 19.98 | 20.03 | 20.00 |
| | W (mm) | 20.03 | 20.00 | 20.04 | 20.01 |
| | Size after test L (mm) | 21.55 | 21.16 | 20.65 | 20.34 |
| | W (mm) | 21.61 | 21.27 | 20.59 | 20.34 |
| | Thickness before test t (mm) | 3.18 | 3.12 | 3.1 | 3.11 |
| | Thickness after test t (mm) | 3.15 | 3.19 | 3.18 | 3.15 |

TABLE 2

| | | Com. Ex. 1 | Com. Ex. 2 | Com. Ex. 3 |
|---|---|---|---|---|
| A1: Organopolysiloxane having vinyl at each end (g) | | 100 | 98 | — |
| A2: Organopolysiloxane having two Si—H groups (g) | | 70 | 70 | 70 |
| A3: Organopolysiloxane having three or more Si—H groups (g) | | 1 | 1 | 1 |
| B: Fluorine-containing organopolysiloxane having vinyl at each end (g) | | — | 2 | 100 |
| Platinum-based catalyst (g) | | 0.3 | 0.3 | 0.3 |
| Curing retarder (g) | | 0.02 | 0.02 | 0.02 |
| Black iron master batch composition (g) | | 18 | 18 | 18 |
| Crushed alumina, D50 = 2 μm, surface treated (g) | | 733 | 733 | 733 |
| Spherical alumina, D50 = 75 μm (g) | | 165 | 165 | 165 |
| Aluminum hydroxide, D50 = 50 μm (g) | | 407 | 407 | 407 |
| Hardness (Asker C) | | 35 | 29 | 75 |
| Thermal conductivity (W/m · K) | | 2.50 | 2.48 | 2.54 |
| Number of alkenyl groups (mol)/base polymer 100 g | | 0.013 | 0.0129 | 0.008 |
| Number of fluoro groups/number of alkenyl groups | | 0 | 1.09 | 54.41 |
| Number of Si—H groups/number of alkenyl groups | | 0.90 | 0.92 | 1.46 |
| Oil resistance test | Weight before test (g) | 3.52 | 3.50 | 3.43 |
| (150° C., immersion for 24 h) | Weight after test (g) | 3.76 | 3.74 | 3.50 |
| | Weight difference (g) | 0.24 | 0.24 | 0.07 |
| | Weight change rate (wt %) | 6.8 | 6.9 | 2.0 |
| | Size before test L (mm) | 20.00 | 20.00 | 20.01 |
| | W (mm) | 20.01 | 20.05 | 20.01 |
| | Size after test L (mm) | 20.98 | 21.37 | 20.03 |
| | W (mm) | 21.18 | 21.61 | 20.04 |
| | Thickness before test t (mm) | 3.1 | 3.19 | 3.11 |
| | Thickness after test t (mm) | 3.3 | 3.20 | 3.15 |

As shown in Tables 1 and 2, the thermally-conductive silicone compositions of Examples 1 to 4 exhibited smaller weight change rates in the oil resistance test results, that is have superior oil resistance, than Comparative Examples 1 and 2. The thermally-conductive silicone composition of Comparative Example 3 exhibited a large Asker C value, that is it is too hard to be used as a thermal interface material (TIM). Examples 1 to 4 realize both excellent oil resistance and hardness suitable for use as a thermal interface material (TIM).

INDUSTRIAL APPLICABILITY

The thermally-conductive silicone composition of the present invention is suitable as a thermal interface material (TIM) that is interposed between a heat generating portion and a heat dissipating member in an electric/electronic component or the like in the environment in which it comes into contact with oil.

LIST OF REFERENCE NUMERALS

- 1 Thermal conductivity measuring apparatus
- 2 Sensor
- 3*a*, 3*b* Sample
- 4 End of sensor
- 5 Current application electrode
- 6 Resistance value electrode (temperature measurement electrode)

The invention claimed is:

1. A thermally-conductive silicone composition comprising organopolysiloxane as a base polymer and a thermally-conductive filler, wherein the base polymer includes a fluorine-free organopolysiloxane and a fluorine-containing organopolysiloxane, the thermally-conductive silicone composition has been cured using an addition-curing catalyst, a ratio of the number of fluoro groups in constituent components of the base polymer to the total number of alkenyl groups bonded to silicon atoms in the constituent components of the base polymer is from 2.00 to 30.0, the constituent components of the base polymer include components A1, A2, A3, and B below A1: fluorine-free organopolysiloxane having two or more alkenyl groups in one molecule, A2: fluorine-free organopolysiloxane having two Si—H groups in one molecule, A3: fluorine-free organopolysiloxane having three or more Si—H groups in one molecule, and B: fluorine-containing organopolysiloxane having two or more alkenyl groups in one molecule, the component A2 is contained in an amount of 50 to 100 parts by mass, and the component A3 is contained in an amount of 0.5 to 2 parts by mass, with respect to 100 parts by mass of the component A1 and the component B in total, the addition-curing catalyst is contained in a catalytic amount, and the thermally-conductive filler is contained in an amount of 100 to 4000 parts by mass with respect to 100 parts by mass of the base polymer.

2. The thermally-conductive silicone composition according to claim 1, wherein the thermally-conductive silicone composition is at least one selected from gel and rubber.

3. The thermally-conductive silicone composition according to claim 1, wherein the thermally-conductive silicone composition has an initial hardness of 1 to 70 on the Asker C scale.

4. The thermally-conductive silicone composition according to claim 1, wherein the thermally-conductive silicone composition has a weight change of 5% by weight or less after immersion in automatic transmission fluid (ATF) at 150° C. for 24 hours.

5. The thermally-conductive silicone composition according to claim 1, wherein the thermally-conductive filler is at least one inorganic filler selected from aluminum oxide, aluminum hydroxide, boron nitride, aluminum nitride, silicon carbide, silicon nitride, and silica.

6. The thermally-conductive silicone composition according to claim 1, wherein the thermally-conductive silicone composition is formed into a sheet-like shape.

7. The thermally-conductive silicone composition according to claim 1, wherein the thermally-conductive silicone composition is a thermal interface material that is interposed between a heat generating member and a heat dissipating member.

8. A method for producing a thermally-conductive silicone gel sheet, comprising uniformly mixing a composition containing a base polymer including a fluorine-free organopolysiloxane and a fluorine-containing organopolysiloxane, an addition-curing catalyst, and a thermally-conductive filler, forming the composition into a sheet-like shape, and thermally curing the composition, wherein a ratio of the number of fluoro groups in constituent components of the base polymer to the total number of alkenyl groups bonded to silicon atoms in the constituent components of the base polymer is from 2.00 to 30.0, the constituent components of the base polymer include components A1, A2, A3, and B below A1: fluorine-free organopolysiloxane having two or more alkenyl groups in one molecule, A2: fluorine-free organopolysiloxane having two Si—H groups in one molecule, A3: fluorine-free organopolysiloxane having three or more Si—H groups in one molecule, and B: fluorine-containing organopolysiloxane having two or more alkenyl groups in one molecule, the component A2 is contained in an amount of 50 to 100 parts by mass, and the component A3 is contained in an amount of 0.5 to 2 parts by mass, with respect to 100 parts by mass of the component A1 and the component B in total, the addition-curing catalyst is contained in a catalytic amount, and the thermally-conductive filler is contained in an amount of 100 to 4000 parts by mass with respect to 100 parts by mass of the base polymer.

9. A method of using the thermally-conductive silicone composition according to claim 1 as a thermal interface material comprising interposing the composition between a heat generating member and a heat dissipating member.

* * * * *